United States Patent Office 3,288,882
Patented Nov. 29, 1966

3,288,882
HARDENABLE EPOXY RESIN COMPOSITIONS
Bernard Peter Stark, Stapleford, Keith Wood Humphreys, Cambridge, and Eric Johnston, Stapleford, England, assignors to Ciba Limited, Basel, Switzerland, a company of Switzerland
No Drawing. Filed Nov. 29, 1961, Ser. No. 155,836
Claims priority, application Great Britain, Dec. 8, 1960, 42,342/60
3 Claims. (Cl. 260—836)

This invention relates to a new type of hardenable epoxy resin composition and to the hardened products obtainable therefrom.

It is well known that epoxy resins can be caused to react with many types of substances in order to produce hardened products having technically advantageous properties. While it is often very desirable that such hardened products should possess flame-retardant properties, or should have only a low combustibility, the methods which have hitherto been devised for the production of hardened epoxy resins which possess low combustibility have certain disadvantages.

Hitherto, three methods have generally been used for the preparation of cured epoxy resins possessing flame-retardant properties. In the first of these methods, a flame-retardant hardener, such as hexachloroendomethylenetetrahydrophthalic anhydride, is used in combination with a bis- or poly-epoxide which does not have flame-retardant properties. However, flame-retardant carboxylic acid or anhydride hardeners which have hitherto been used are solids having high melting points and the mixture of epoxy resin and hardener must therefore be heated to a high temperature in order to dissolve the hardener in the resin and to maintain the hardener, once dissolved, in solution. In the majority of cases, therefore, the usable lives of such epoxy resin-hardener mixtures, at the temperatures which are necessary to maintain the mixtures in a homogenous state, are inconveniently short. Furthermore, such mixtures cannot be stored for long periods of time at ambient temperatures (such as 20–25° C.) without either hardening or becoming heterogenous due to precipitation of the hardener from the mixture.

In certain cases, some of the above-mentioned disadvantages may be avoided by the use of mixtures of anhydrides of dicarboxylic acids which are liquid at room temperature, e.g. a mixture of the various isomers of methylendomethylenetetrahydrophthalic acid anhydride, but in general it is found that either such mixtures of anhydrides are inconveniently inactive as hardeners for epoxy resins, so that the times which are necessary to harden the epoxy resin hardener mixtures by heating at elevated temperatures are excessively long, or the various components of the anhydride mixture do not have equal activities as hardening agents, so that substantial numbers of carboxyl and/or anhydride groupings still remain unreacted in the cured resin. Most of the liquid anhydride mixtures which hitherto have commonly been used for the purpose of hardening epoxy resins have the further disadvantage that they do not confer flame-retardant properties on the cured epoxy resin. Up to the present time, no satisfactory flame-retardant hardeners for epoxy resins, other than the carboxylic acids and anhydrides previously mentioned, have been discovered.

In the second method for the production of flame-retardant hardened epoxy resins, almost any known hardener for epoxy resins is used in combination with an epoxy resin which itself has flame-retardant properties, for example the diglycidyl ether of 2,3-di(hydroxymethyl)-1,4,5,6,7,7-hexachlorobicyclo-(2:2:1)-hept - 5 - ene. These flame-retardant epoxy resins, however, have the disadvantages that, as commonly prepared, they are dark-coloured and very viscous liquids, or alternatively they are solids, so that their mixtures with hardeners have very limited usable and storage lives.

In the third method, a flame-retardant material, such as trichloroethyl phosphate, is mixed with an epoxy resin and with a hardener for the resin. Such additives, however, often have disadvantageous effects, such a substantial lowering of the heat stability, on the properties of the hardened epoxy resin.

According to the present invention a hardenable epoxy resin composition comprises in admixture an epoxy resin, a hardener therefor, and a cyclic compound of the general formula:

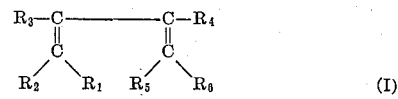

wherein either $R_1$ and $R_5$ together represent a divalent grouping and $R_2$, $R_3$, $R_4$ and $R_6$ each represent hydrogen atoms or monovalent substituents, or $R_3$ and $R_4$ together with the carbon atoms to which they are attached represent a cyclic system and $R_1$, $R_2$, $R_5$ and $R_6$ each represent hydrogen atoms or monovalent substituents, $R_1$, $R_2$, $R_3$, $R_4$, $R_5$ and $R_6$ including at least four substituent halogen atoms, one at least of the epoxy resin and the hardener containing at least one olefinic double bond. Such compositions can be hardened by heating.

The aforesaid cyclic compounds of general Formula I are herein referred to for brevity as "polyhalodienes" and the said term is to be understood to include only compounds of general Formula I.

The new hardenable mixtures of the invention have advantages over previously known mixtures in that they are generally either completely liquid, at room temperature, or may be rendered liquid very readily by gentle heating, they can often be stored for a considerable time at ambient temperatures without hardening or without a substantial proportion of the hardener separating in solid form, and they form hardened products which have very low combustibility.

A further advantage of the mixtures of the invention is that, although they may often be stored at low or moderate temperatures for long periods of time, they may be rapidly hardened by being heated for short periods of time at elevated temperatures. This new and surprising property of the compositions of the present invention apparently has two main causes. First, the polyhalodiene acts, at low temperatures, as an inert diluent of the epoxy resin-hardener mixture and thereby the hardening action of the hardener on the epoxy resin is retarded. Secondly, Diels-Alder reactions of the cyclic polyhalodienes with the C=C double bonds of the resin or hardener generally proceed only slowly at low temperatures, but much more rapidly at elevated temperatures, for example 140° C.

One preferred class of polyhalodienes which may be used in the compositions of the present invention is that which conforms to the general Formula II.

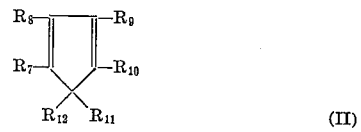

wherein the symbols $R_7$, $R_8$, $R_9$, $R_{10}$, $R_{11}$ and $R_{12}$ represent hydrogen atoms or monovalent substituents such as halogen atoms, alkoxy groups, thioether groups, or aliphatic, cycloaliphatic, araliphatic or aromatic hydrocarbon residues, at least four of the said symbols representing halogen atoms.

Especially suitable polyhalodienes conforming to the general Formula II are: hexachlorocyclopentadiene, tetrachlorocyclopentadiene, pentachlorocyclopentadiene, tetrachlorocyclopentadienone dimethyl ketal, tetrachlorocyclopentadienone diethyl ketal, the dimethyl dithioketal of tetrachlorocyclopentadienone, hexafluorocyclopentadiene, and 1-benzyl-2,3,4,5,5-pentachlorocyclopentadiene.

A second preferred class of polyhalodienes which may be used in the compositions of the present invention is that which is represented by the general Formula III:

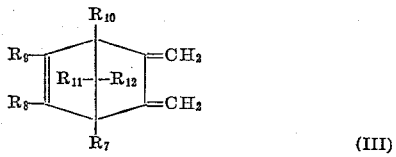

(III)

wherein the symbols $R_7$, $R_8$, $R_9$, $R_{10}$, $R_{11}$ and $R_{12}$ have the meanings assigned to them above and at least four of the said symbols represent halogen atoms.

Especially suitable compounds conforming to the general Formula III are: 5,6-dimethylene-1,2,3,4,7,7-hexachlorobicyclo(2:2:1)-hept-2-ene and 5,6-dimethylene-1,2,3,4,7,7-hexafluorobicyclo(2:2:1)-hept-2-ene.

Examples of unsaturated epoxides which may serve as dienophiles in the compositions of the invention are: mono- or poly-glycidyl ethers of olefinically unsaturated mono- or poly-alcohols, such as tetrahydrobenzyl glycidyl ether, or the diglycidyl ether of but-2-ene-1,4-diol; mono- or poly-glycidyl ethers of mono- or poly-phenols whose aromatic nuclei are substituted by olefinically unsaturated groupings, such as o-allylphenyl glycidyl ether or the diglycidyl ether of bis(p-hydroxy-m-allylphenyl)dimethylmethane; mono- or poly-glycidyl esters of olefinically unsaturated mono- or poly-carboxylic acids, such as glycidyl methacrylate or di(4 - oxa-tetracyclo-(6:2:1:0$^{2,7}$:0$^{3,5}$)-hendec-8(or 9)yl)maleate; the products which are obtained by incomplete epoxidation of acyclic or alicyclic polyunsaturated hydrocarbons, such as vinylcyclohexane monoxide or polybutadiene which has been treated with an amount of an epoxidising agent (e.g. peracetic acid) which is insufficient to cause epoxidation of all the C=C double bonds present in the molecule; unsaturated ethers containing epoxy groups such as the allyl ether of 2,3-epoxycyclopentanol; and unsaturated acetals containing epoxide groups.

Saturated epoxides may also be present in the hardenable compositions of the invention, e.g. mono- or polyglycidyl ethers of saturated mono- or poly-alcohols, such as butyl alcohol, butane-1,4-diol or glycerine, or of saturated mono- or poly-phenols, such as resorcinol or bis(4-hydroxyphenyl)dimethylmethane, or of condensation products of aldehydes with phenols (Novolaks), polyglycidyl esters of polycarboxylic acids, such as phthalic acid, and mono- and poly-epoxides of alicyclic compounds.

It is generally advantageous to have present in the compositions of the invention at least one polyepoxide, which may be either saturated or unsaturated.

The hardeners which may be used in the compositions of the invention may be either saturated or olefinically unsaturated; however, should no unsaturated epoxide resin be present in the hardenable mixture, it is necessary that at least one unsaturated hardener should be present in the mixture.

Olefinically unsaturated hardeners which may be used in the compositions of the invention are preferably polybasic carboxylic acids or their anhydrides, which contain at least one C=C double bond. Examples of such hardeners are dodecenylsuccinic anhydride, maleic anhydride, endomethylenetetrahydrophthalic anhydride, citraconic anhydride, itaconic acid, and tetrahydrophthalic anhydride, or their mixtures. In addition to the unsaturated hardeners, saturated hardeners or hardeners which are not capable of acting as dienophiles in the Diels-Alder reaction, e.g. hexachloroendomethylenetetrahydrophthalic anhydride, may also be present in the compositions of the invention.

Examples of hardeners which do not contain olefinic unsaturation which may be used are amines or amides such as aliphatic and aromatic primary, secondary and tertiary amines, e.g. mono-, di- and tri-butylamines, p-phenylenediamine, bis-(p-aminophenyl)methane, ethylenediamine, N:N-diethylethylenediamine, diethylenetriamine, tetra(hydroxyethyl)-diethylenetriamine, triethylenetetramine, tetraethylenepentamine, trimethylamine, diethylamine, triethanolamine, mannich bases, piperidine, guanidine and guanidine derivatives such as phenylguanidine and diphenylguanidine, dicyandiamide, aniline-formaldehyde resins, polymers of amino-styrenes, polyamides, e.g. those from aliphatic polyamines and di- or tri-merised unsaturated fatty acids, isocyanates, isothiocyanates, polyhydric phenols, e.g. resorcinal, hydroquinone, bis(4-hydroxyphenyl)-dimethylmethane, and quinone, phenol-aldehyde resins, oil-modified phenol-aldehyde resins, reaction products of aluminum alkoxides or phenolates with tautomeric reacting compounds of the acetoacetic ester type, Friedel-Crafts catalysts, e.g. $AlCl_3$, $SbCl_5$, $SnCl_4$, $ZnCl_2$, $BF_3$ and their complexes with organic compounds and phosphoric acid. The preferred hardeners not having olefinic unsaturation are polybasic carboxylic acids and their anhydrides, e.g. phthalic anhydride, hexahydrophthalic anhydride, or succinic anhydride.

In some cases, accelerators for the hardening action may also be present in the compositions of the invention; suitable accelerators are tertiary amines such as benzyldimethylamine, and poly-hydroxy compounds such as hexane-triol and glycerol.

The compositions of this invention may also contain fillers, plasticisers or colouring agents, for example asphalt, bitumen, glass fibres, mica, quartz powder, cellulose, kaolin, finely-divided kieselguhr (Aerosiel) or metal powder.

In the compositions of the invention, for each molar equivalent of olefinic double bonds (—C=C—) capable of taking part in a Diels-Alder reaction, there are preferably present 0.5 to 1.2 molar equivalents of the polyhalodiene conjugated unit (—C=C—C=C—). The reaction between these two entities will ideally involve stoichiometric proportions, i.e. equal molar quantities, but unreacted olefinic double bonds present in a mixture deficient in polyhalodiene are not necessarily disadvantageous: the criterion being that sufficient polyhalodiene must be incorporated to confer adequate flame resistance. Conversely an excess of polyhalodiene can be tolerated for, if it is not expelled from the resin on curing, it may in certain instances serve advantageously as a plasticiser.

The molecular ratios employed of hardener to epoxide resin are similar to those conventionally employed in the hardening of epoxide resins. Thus, for example, with an anhydride hardener, 0.5–1.0 anhydride equivalent per epoxide equivalent are generally required for optimum results, and with an amine hardener, 0.8–1.3 equivalents of active hydrogen per epoxide equivalent are generally satisfactory.

When a mixture in accordance with the present invention comprising epoxy resin, hardener, and polyhalodiene is subjected to the action of heat, a hardened (i.e. insoluble and infusible) cross-linked product, in which all three components have reacted together, is produced, and according to a further feature of the invention, therefore, there are provided hardened epoxy resin compositions obtained by heating the aforesaid new mixtures containing a polyhalodiene.

Such a hardened product is obtained as a result of two types of reaction, which occur simultaneously during the hardening process, and which lead to the linking together of different molecular species. The first of these reactions is a reaction of the epoxy resin with the anhydride and/or carboxylic groupings of the hardener, in the same well-known manner as occurs in the conventional methods of hardening of epoxy resins with such hardeners. The second is a reaction of the Diels-Alder type, which in the present case is a reaction between the polyhalodiene (containing a conjugated C=C—C=C grouping) and the resin or hardener containing a C=C double bond. In these reactions of the Diels-Alder type, the product is a cyclic unsaturated compound and the reaction may be represented as follows:

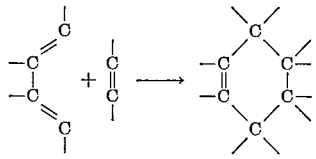

The aforesaid compositions may be used in the filled or unfilled state, e.g., in the form of solutions or emulsions, as textile auxiliaries, laminated resins, varnishes, lacquers, dipping resins, casting resins, and encapsulating, coating, filling and packing materials, adhesives and the like, as well as for the preparation of such materials.

The following examples will serve to illustrate the invention. In these examples the parts are by weight and the temperatures are in degrees centigrade.

EXAMPLE I 28.6 parts of the polyglycidyl ether of a polyhydric phenol (which was prepared in a known manner by the reaction of epichlorohydrin with 2,2-bis(p-hydroxyphenyl)propane under alkaline conditions, and which had an epoxy value of 5.2 equivalents per kg.) were mixed with 27.3 parts of hexachlorocyclopentadiene and with 9.8 parts of maleic anhydride. The mixture was warmed gently and stirred until it became homogeneous; it was then cast into an aluminum mould, and was heated at 140° for 48 hours. A pale yellow hardened casting was obtained.

EXAMPLE II 28.6 parts of the glycidyl ether described in Example I were mixed with 27.3 parts of hexachlorocyclopentadiene and with 9.8 parts of maleic anhydride. The mixture was kept at room temperature for 8 weeks, at the end of which time it was still liquid and readily pourable. It was then heated for 24 hours at 140°, a pale yellow hardened casting being obtained.

EXAMPLE III 14.3 parts of the glycidyl ether described in Example I were mixed with 4.9 parts of maleic anhydride and 13.2 parts of the dimethyl ketal of tetrachlorocyclopentadienone and the mixture was heated for 18 hours at 140°. A pale yellow hardened casting was obtained.

EXAMPLE IV 17.8 parts of the diglycidyl ether of bis(p-hydroxy-m-allylphenyl)dimethylmethane were mixed with maleic anhydride (4.9 parts) and with the dimethyl ketal of tetrachlorocyclopentadienone (25 parts) and the mixture was cast into aluminum moulds and heated for 2 hours at 100°, then for 3 hours at 120°, and finally for 18 hours at 145°. A pale yellow-brown hardened casting was obtained.

EXAMPLE V 14.3 parts of the glycidyl ether described in Example I were mixed with 13.2 parts of the dimethyl ketal of tetrachlorocyclopentadienone and with 4.9 parts of maleic anhydride and 0.1 part of benzyldimethylamine. The mixture was heated for 2 hours at 120° and then for 18 hours at 140°, at the end of which time a black hard resin was obtained.

EXAMPLE VI 8.58 parts of the glycidyl ether described in Example I were mixed with 8.19 parts of hexachlorocyclopentadiene, 2.94 parts of maleic anhydride, and 0.1 part of benzyldimethylamine. The mixture was heated for 1½ hours at 120° and then for 18 hours at 140°, at the end of which time a black hard resin was obtained.

EXAMPLE VII

Mixtures of the polyglycidyl ether described in Example I, hexachlorocyclopentadiene and tetrahydrophthalic anhydride were prepared as shown in Table I, and heated in aluminum moulds for 70 hours at 140°. In each case a brown hardened casting was obtained.

*Table I*

| Parts of epoxide | Parts of diene | Parts of anhydride | Molar ratio of diene to anhydride | Equivs. of anhydride per epoxy equiv. |
|---|---|---|---|---|
| 10 | 4.55 | 3.16 | 0.8 | 0.4 |
| 10 | 5.70 | 3.95 | 0.8 | 0.5 |
| 10 | 6.90 | 4.75 | 0.8 | 0.6 |
| 10 | 7.90 | 5.50 | 0.8 | 0.7 |
| 5 | 4.55 | 3.15 | 0.8 | 0.8 |
| 5 | 5.10 | 3.55 | 0.8 | 0.9 |
| 5 | 5.70 | 3.95 | 0.8 | 1.0 |
| 5 | 6.25 | 4.35 | 0.8 | 1.1 |

EXAMPLE VIII

Mixtures of the polyglycidyl ether described in Example I, hexachlorocyclopentadiene, and maleic anhydride were prepared as shown in Table II, and were cast into aluminium moulds and heated for 2 hours at 120° and then for 18 hours at 140°; in each case a yellow-brown hardened casting was obtained.

*Table II*

| Parts of epoxide | Parts of diene | Parts of anhydride | Molar ratio of diene to anhydride |
|---|---|---|---|
| 10.0 | 12.0 | 3.6 | 1.2:1 |
| 10.0 | 11.0 | 3.6 | 1.1:1 |
| 10.0 | 10.0 | 3.6 | 1.0:1 |
| 10.0 | 9.0 | 3.6 | 0.9:1 |
| 10.0 | 8.0 | 3.6 | 0.8:1 |
| 10.0 | 7.0 | 3.6 | 0.7:1 |
| 10.0 | 6.0 | 3.6 | 0.6:1 |
| 10.0 | 5.0 | 3.6 | 0.5:1 |

EXAMPLE IX

Mixtures of the polyglycidyl ether described in Example I with hexachlorocyclopentadiene and maleic anhydride were prepared as shown in Table III, and were cast into moulds and heated for 18 hours at 140°; in each case a yellow-brown hardened casting was obtained.

*Table III*

| Parts of diene | Parts of epoxide | Parts of anhydride | Moles of diene per mole of anhydride | Anhydride equiv. per epoxy equiv. |
|---|---|---|---|---|
| 6.82 | 12.05 | 2.45 | 1 | 0.4 |
| 6.82 | 9.15 | 2.45 | 1 | 0.5 |
| 6.82 | 8.05 | 2.45 | 1 | 0.6 |
| 13.65 | 13.8 | 4.9 | 1 | 0.7 |
| 13.65 | 12.0 | 4.9 | 1 | 0.8 |
| 13.65 | 10.7 | 4.9 | 1 | 0.9 |
| 13.65 | 9.6 | 4.9 | 1 | 1.0 |

EXAMPLE X 13.5 g. of the epoxidised tall oil fatty acid ester of dihydrodicyclopentadienol, 10.0 g. of hexachlorocyclopentadiene and 3.6 g. of maleic anhydride were mixed and warmed until a homogeneous solution was obtained. The resulting mixture was cast into an aluminium mould and heated for 18 hours at 140°; a black, hardened casting was obtained.

EXAMPLE XI 10.0 g. of the epoxidized tall oil fatty acid ester of dihydrodicyclopentadienol were mixed with 3.5 g. of the epoxidised dihydrodicyclopentadienol and with 10 g. of hexachlorocyclopentadiene and 3.6 g. of maleic anhydride, and the resulting mixture was heated for 18 hours at 140°; at the end of this time a black hard resin was obtained.

EXAMPLE XII

Mixtures of the glycidyl ether described in Example I, allylphenyl glycidyl ether, hexachlorocyclopentadiene and maleic anhydride were prepared as shown in Table IV, heated at 120° for 2 hours and then at 140° for 16 hours. In each case a hardened, insoluble and infusible resin was obtained.

*Table IV*

| Grams of diene | Grams of polyglycidyl ether | Grams of allylphenyl glycidyl ether | Grams of maleic anhydride |
|---|---|---|---|
| 27.3 | 22.8 | 5.8 | 9.8 |
| 35.6 | 22.8 | 5.8 | 9.8 |
| 27.3 | 17.0 | 11.6 | 9.8 |

EXAMPLE XIII

A mixture of 12.4 parts of the dimethyl ketal of tetrachlorocyclopentadienone, 12.4 parts of the diglycidyl ether of bis(p-hydroxy-m-allylphenyl)-dimethylmethane, and 1.1 parts of triethylenetetramine was heated at 60° for 18 hours and then for 8 hours at 140°. At the end of this time a hard black resin was obtained.

EXAMPLE XIV 14.3 parts of the glycidyl ether described in Example I were mixed with 10 parts of the diethyl ketal of tetrachlorocyclopentadienone and with 4.9 parts of maleic anhydride, and the mixture was heated for 48 hours at 140°, at the end of which time a hard yellow resin was obtained.

EXAMPLE XV 14.3 parts of the glycidyl ether described in Example I were mixed with 10 parts of ethylpentachlorocyclopentadiene and 4.9 parts of maleic anhydride. A brown hardened resin was obtained by heating this mixture for 30 hours at 140°.

EXAMPLE XVI 14.3 parts of the glycidyl ether described in Example I were heated with 10 parts of diethyltetrachlorocyclopentadiene and 4.9 parts of maleic anhydride for 30 hours at 140°. A hard brown resin resulted.

EXAMPLE XVII 14.3 g. of the polyglycidyl ether described in Example I were mixed with 4.9 g. of maleic anhydride and 11.9 g. of pentachlorocyclopentadiene. The mixture was heated for 2 hours at 120° and then for 16 hours at 140°, and a black hardened resin was obtained.

EXAMPLE XVIII

Mixtures of 2,3-dimethylene-1,4,5,6,7,7-hexachlorobicyclo [2,2,1]-hept-5-ene, maleic anhydride, and the polyglycidyl ether described in Example I were prepared as shown in Table V, and were heated for 16 hours at 120° and then for 8 hours at 140°. In each case a hardened, insoluble and infusible resin was obtained.

*Table V*

| Parts of triene | Parts of epoxide | Parts of anhydride |
|---|---|---|
| 6.5 | 10 | 3.64 |
| 10.9 | 10 | 3.64 |
| 11.8 | 10 | 3.64 |
| 8.32 | 10 | 4.16 |
| 12.48 | 10 | 4.16 |

EXAMPLE XIX

In this example application and mechanical properties of an epoxide resin composition containing a hardener of the present invention are compared with those of a composition containing as hardener hexachloroendomethylene-tetrahydrophthalic anhydride (het anhydride).

The resin used was that described in Example I. Where castings were required for determination of reflection temperature and mechanical properties they were prepared by the methods prescribed and published by the American Society for Testing Materials. Preliminary experiments were performed to establish optimum curing conditions and concentration of hardener. Optimum conditions are defined as those giving the maximum attainable deflection temperature.

*Formulation 1*—containing a hardener of the present invention, was as follows:

|  | Parts |
|---|---|
| Epoxide resin | 100 |
| Maleic anhydride | 50.5 |
| Hexachlorocyclopentadiene | 140.5 | and the curing conditions were 6 hours at 120° followed by 36 hours at 160°.

*Formulation 2*—containing the prior art hardener, was as follows:

|  | Parts |
|---|---|
| Epoxide resin | 100 |
| Het anhydride | 191 | and the curing conditions were 2 hours at 120° followed by 24 hours at 160°.

The results of the comparison are tabulated below.

|  | Formulation 1. | Formulation 2. |
|---|---|---|
| Method of preparation of resin hardener mixture | Resin and maleic anhydride preheated separately to 60° and stirred together for 2 minutes at 60°. The hexachlorocyclopentadiene was then stirred in. | Resin and hardener preheated separately to 120° and stirred together at 120° until, after 10 mins. a clear solution was formed. |
| Condition of the resin-hardener mixture at 21° after rapid cooling. | Clear yellow liquid of viscosity 1.5 poises | Clear amber solid. |
| Pot life as measured with Techne gelation timer: | | |
| 1 at 60° | 77 hours 31 minutes | Too viscous to test. |
| 2 at 120° | 3 hours 36 minutes | 22 minutes. |
| Deflection Temperature. Determined according to ASTM D648-56, 264 p.s.i. fibre stress. | 140° | 168°. |
| Flexural strength. Determined according to ASTM D790-59T. | 823 kg./sq. cm | 560 kg./sq. cm. |
| Modulus of elasticity by flexure. Determined according to ASTM D790-59T. | 34,500 kg./sq. cm | 27,400 kg./sq. cm. |
| Flammability. Determined according to ASTM D635-56T, specimen thickness 0.32 cm. | Non-burning | Non-burning. |

What is claimed is:
1. A heat-hardenable flame-retardant resin composition which comprises:
   (1) an 1,2-epoxy compound having an 1,2-epoxy equivalency greater than 1,
   (2) a polycarboxylic acid anhydride containing one dienophile C=C double bond, and
   (3) a diene selected from the class consisting of compounds of the formula

$$\begin{array}{c} R_3-C\!=\!\!=\!\!C-R_2 \\ R_4-C\phantom{==}C-R_1 \\ \diagdown\phantom{=}\diagup \\ C \\ R_5\phantom{=}R_6 \end{array}$$

and compounds of the formula

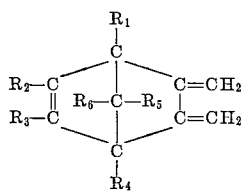

wherein $R_1$, $R_2$, $R_3$ and $R_4$ represent a member selected from the group consisting of chlorine and fluorine and $R_5$ and $R_6$ each are selected from the class consisting of hydrogen atom, halogen atom, lower alkyl and lower alkoxy group.

2. A heat-hardenable flame-retardant composition which comprises:
 (1) an 1,2-epoxy compound having an 1,2-epoxy equivalency greater than 1,
 (2) maleic acid anhydride, and
 (3) hexachlorocyclopentadiene.

3. A heat-hardenable flame-retardant composition which comprises:
 (1) an 1,2-epoxy compound having an 1,2-epoxy equivalency greater than 1,
 (2) maleic acid anhydride, and
 (3) the dimethylketal of tetrachlorocyclopentadienone.

References Cited by the Examiner

UNITED STATES PATENTS

| | | | |
|---|---|---|---|
| 2,744,845 | 5/1956 | Rudoff | 260—47 |
| 2,779,700 | 1/1957 | Robitschek et al. | 260—869 |
| 2,840,540 | 6/1958 | Rosenberg et al. | 260—47 |
| 2,848,433 | 8/1958 | Elrich | 260—837 |
| 3,099,638 | 7/1963 | Foster | 260—837 |

OTHER REFERENCES

Lee et al.: "Epoxy Resins," pp. 124, 136 and 137 relied on, McGraw-Hill Book Company, Inc., New York, 1957.

SAMUEL H. BLECH, *Primary Examiner.*

JOSEPH R. LIBERMAN, WILLIAM H. SHORT,
*Examiners.*

T. D. KERWIN, *Assistant Examiner.*